(12) United States Patent
Heo et al.

(10) Patent No.: US 10,977,801 B2
(45) Date of Patent: *Apr. 13, 2021

(54) METHOD AND APPARATUS FOR TRACKING OBJECT

(71) Applicant: SAMSUNG ELECTRONICS CO., LTD., Suwon-si (KR)

(72) Inventors: Jingu Heo, Yongin-si (KR); Dong Kyung Nam, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/936,958

(22) Filed: Jul. 23, 2020

(65) Prior Publication Data

US 2020/0357124 A1 Nov. 12, 2020

Related U.S. Application Data

(63) Continuation of application No. 16/013,614, filed on Jun. 20, 2018, now Pat. No. 10,755,420.

(30) Foreign Application Priority Data

Oct. 27, 2017 (KR) .................. 10-2017-0141332

(51) Int. Cl.
*G06T 7/20* (2017.01)
*G06K 9/20* (2006.01)
(Continued)

(52) U.S. Cl.
CPC ............... *G06T 7/20* (2013.01); *G01S 1/00* (2013.01); *G02B 27/0093* (2013.01);
(Continued)

(58) Field of Classification Search
CPC combination set(s) only.
See application file for complete search history.

(56) References Cited

U.S. PATENT DOCUMENTS 7,206,435 B2   4/2007  Fujimura et al.
8,066,375 B2  11/2011  Skogo et al.
(Continued)

FOREIGN PATENT DOCUMENTS

DE   102014204845 A1   9/2015
EP       1693782 A1    8/2006
(Continued)

OTHER PUBLICATIONS

Torresan et al. ,"Advanced Surveillance Systems: Combining Video and Thermal Imagery for Pedestrian Detection", Proc. of SPIE vol. 5405 Apr. 12, 2004, pp. 506-511.*
(Continued)

*Primary Examiner* — Omar S Ismail
(74) *Attorney, Agent, or Firm* — Sughrue Mion, PLLC

(57) ABSTRACT

An object tracking method and apparatus are provided. The object tracking method includes detecting a target object in a first-type input image that is based on light in a first wavelength band, tracking the target object in the first-type input image based on detection information of the target object, measuring a reliability of the first-type input image by comparing the first-type image to an image in a database, comparing the reliability of the first-type input image to a threshold, and tracking the target object in a second-type input image that is based on light in a second wavelength band.

19 Claims, 12 Drawing Sheets

(51) Int. Cl.

| | |
|---|---|
| *G06K 9/62* | (2006.01) |
| *G06K 9/03* | (2006.01) |
| *G06K 9/32* | (2006.01) |
| *G02B 30/26* | (2020.01) |
| *G06K 9/00* | (2006.01) |
| *G02B 27/00* | (2006.01) |
| *G01S 1/00* | (2006.01) |
| *G06T 7/00* | (2017.01) |

(52) U.S. Cl.
CPC ......... *G02B 30/26* (2020.01); *G06K 9/00604* (2013.01); *G06K 9/036* (2013.01); *G06K 9/2018* (2013.01); *G06K 9/2027* (2013.01); *G06K 9/3241* (2013.01); *G06K 9/6212* (2013.01); *G06T 7/0002* (2013.01); *G06K 2009/3291* (2013.01); *G06T 2207/10024* (2013.01); *G06T 2207/10048* (2013.01); *G06T 2207/10152* (2013.01); *G06T 2207/30168* (2013.01)

(56) References Cited

U.S. PATENT DOCUMENTS

| | | | |
|---|---|---|---|
| 9,430,040 | B2 | 8/2016 | Zhang et al. |
| 10,225,462 | B2 | 3/2019 | Murakami et al. |
| 10,698,204 | B1* | 6/2020 | Ouderkirk .......... G02B 27/0172 |
| 2004/0066966 | A1 | 4/2004 | Schneiderman |
| 2010/0054462 | A1 | 3/2010 | Boon |
| 2010/0182433 | A1 | 7/2010 | Shimbo et al. |
| 2012/0206335 | A1* | 8/2012 | Osterhout ................ G06F 3/017 |
| | | | 345/156 |
| 2014/0350395 | A1 | 11/2014 | Shachaf et al. |
| 2015/0243036 | A1 | 8/2015 | Hoffmann et al. |
| 2015/0309568 | A1* | 10/2015 | Miki ....................... G06F 3/012 |
| | | | 345/173 |
| 2016/0117554 | A1 | 4/2016 | Kang et al. |
| 2017/0018823 | A1 | 1/2017 | Kwon |
| 2017/0031160 | A1 | 2/2017 | Popovich et al. |
| 2017/0053211 | A1 | 2/2017 | Heo et al. |
| 2017/0192499 | A1* | 7/2017 | Trail ....................... G06F 3/011 |
| 2018/0098057 | A1 | 4/2018 | Heo et al. |
| 2020/0016745 | A1 | 1/2020 | Tang et al. |

FOREIGN PATENT DOCUMENTS

| | | |
|---|---|---|
| GB | 2375913 A | 3/2002 |
| JP | 2001-340300 A | 12/2001 |
| JP | 2016-532396 A | 10/2016 |
| KR | 10-2017-0026615 A | 3/2017 |

OTHER PUBLICATIONS

Communication dated Jan. 23, 2019, issued by the European Patent Office in counterpart European Application No. 18183086.0.
Helene Torresan et al.,"Advanced surveillance systems: combining video and thermal imagery for pedestrian detection", Proceedings of SPIE, vol. 5405, Apr. 12, 2004, pp. 506-515, (12 pages total).
Juan Serrano-Cuerda et al., "Selection of a Visible-Light vs. Thermal Infrared Sensor in Dynamic Environments Based on Confidence Measures" Applied Science, vol. 4, No. 3, Aug. 8, 2014, pp. 331-350 (20 pages total).
Torresan et al. (NPL Doc.: Advanced Surveillance Systems: Combining Video and Thermal Imagery for Pedestrian Detection, Proc. of SPIE vol. 5405 Apr. 12, 2004, pp. 506-511.

* cited by examiner

METHOD AND APPARATUS FOR TRACKING OBJECT

CROSS-REFERENCE TO RELATED APPLICATION

This application is a Continuation of U.S. application Ser. No. 16/013,614, filed on Jun. 20, 2018, which claims priority from Korean Patent Application No. 10-2017-0141332, filed on Oct. 27, 2017, in the Korean Intellectual Property Office, the disclosure of which is incorporated herein by reference in its entirety.

BACKGROUND

1. Field

Methods and apparatuses consistent with exemplary embodiments relate to tracking an object.

2. Description of the Related Art

Generally, to track an object, an object may be detected from an image acquired by a camera, representative feature points of the object may be extracted, and coordinates of the object may be extracted for each frame based on the extracted feature points. For more comfortable viewing of a three-dimensional (3D) image, 3D coordinates of both eyes may be required. To acquire the 3D coordinates, two-dimensional (2D) information relating to the eyes, rotation information relating to a face, and an interpupillary distance may be used. The 3D coordinates may be extracted for each frame, and thus positions of the eyes may be tracked and a 3D image may be generated based on the positions of the eyes.

SUMMARY

According to an aspect of an exemplary embodiment, there is provided an object tracking method including detecting a target object in a first-type input image that is based on light in a first wavelength band, tracking the target object in the first-type input image based on detection information of the target object when the target object is detected in the first-type input image, measuring a reliability of the first-type input image by comparing the first-type input image to an image in a first database (DB), and tracking the target object in a second-type input image based on the detection information when the reliability of the first-type input image is lower than a first threshold, the second-type input image being based on light in a second wavelength band, different than the first wavelength band.

The first wavelength band may include visible light and the second wavelength band may include infrared (IR) light. The first-type input image and the second-type input image may be acquired by a camera from which an IR-cut filter is removed for acquisition of the second-type input image. The object tracking method may further include controlling an IR light source configured to output IR light when the reliability of the first-type input image is lower than the first threshold. The first wavelength band may include visible light. The image stored in the first DB may have a reliability higher than a predetermined threshold, and may be a first reference image acquired based on light in the first wavelength band.

The object tracking method may further include measuring a reliability of the second-type input image by comparing the second-type input image to an image stored in a second DB, and detecting the target object from the first-type input image or the second-type input image when the reliability of the second-type input image is lower than a second threshold. The image stored in the second DB may have a reliability higher than a predetermined threshold, and may be a second reference image acquired based on light in the second wavelength band.

The object tracking method may further include detecting the target object in the second-type input image when the target object is not detected in the first-type input image. The object tracking method may further include tracking the target object in the second-type input image based on the detection information when the target object is detected in the second-type input image, measuring a reliability of the second-type input image by comparing the second-type input image to an image stored in a second DB, and tracking the target object in the first-type input image based on the detection information when the reliability of the second-type input image is lower than a second threshold.

The detecting of the target object on the first-type input image may be performed using a first detector trained in advance based on error data. The error data may include at least one of data obtained when a detection of the target object is not completed and data obtained when another object is incorrectly detected as the target object, from among training data.

The detection information may include a detection area corresponding to a location of the target object in a first frame of the first-type input image. The tracking of the target object in the first-type input image may include tracking the target object in a second frame of the first-type input image based on the detection area.

According to an aspect of another exemplary embodiment, there is provided an object tracking apparatus including a processor, and a memory including an instruction that is readable by the processor, wherein the instruction is executed by the processor, and the processor is thereby configured: to detect a target object in a first-type input image that is based on light in a first wavelength band, to track the target object in the first-type input image based on detection information of the target object when the target object is detected in the first-type input image, to measure a reliability of the first-type input image by comparing the first-type input image to an image stored in a first DB, and to track the target object in a second-type input image based on the detection information when the reliability of the first-type input image is lower than a first threshold, the second-type input image being based on light in a second wavelength band, different from the first wavelength band.

BRIEF DESCRIPTION OF THE DRAWINGS

The above and/or other exemplary aspects will be more apparent by describing certain exemplary embodiments with reference to the accompanying drawings, in which.

DETAILED DESCRIPTION

Figure 1:
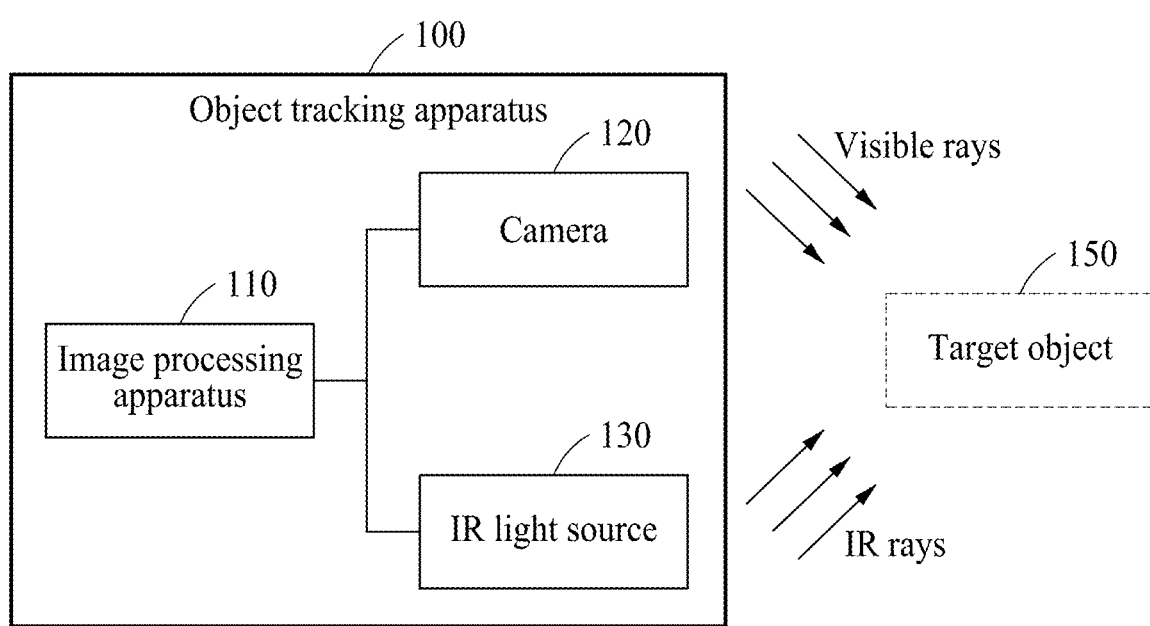
FIG. 1 is a block diagram illustrating an object tracking apparatus according to an exemplary embodiment.

The following describes exemplary embodiments, and the scope of the exemplary embodiments is not limited to the descriptions provided in the present specification. Various changes and modifications can be made thereto by those of ordinary skill in the art.

Although terms "first" and/or "second" may be used to explain various components, the components are not limited to these terms. These terms are intended merely to distinguish one component from another component. For example, a "first" component may be referred to as a "second" component, or similarly, the "second" component may be referred to as the "first" component within the present scope, according to the concept of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art, and are not to be construed as an ideal or excessively formal meaning unless otherwise defined herein.

Hereinafter, exemplary embodiments will be described in detail below with reference to the accompanying drawings, and like reference numerals refer to the like elements throughout the present specification.

FIG. 1 is a block diagram illustrating an object tracking apparatus 100 according to an exemplary embodiment. Referring to FIG. 1, the object tracking apparatus 100 includes an image processing apparatus 110, a camera 120 and an infrared (IR) light source 130. The object tracking apparatus 100 may detect a target object 150 from an input image acquired by the camera 120, and may track the detected target object 150. For example, the target object 150 may be the eyes of a user, and the object tracking apparatus 100 may track the eyes as the target object 150 in the input image, with a high accuracy. The target object 150 may alternately include, for example, an object such as a vehicle, a bicycle or a body part such as a face or a hand other than the eyes. In the following description, an example in which the target object 150 corresponds to a user's eyes will be described; however, the target object 150 may be an object other than the eyes.

For a glasses-free three-dimensional (3D) display, eye positions of a user may be required. A glasses-free 3D apparatus may track the eyes of a user using a camera and may output a 3D image corresponding to the positions of the eyes. A 3D heads-up display (HUD) may display, on a windshield, navigation information, information used to assist with driving in bad weather, and dangerous situations or hazards. Because an accurate representation of 3D information on a road is important in the 3D HUD, the eye positions may need to continue to be precisely detected. For example, eye positions may need to continue to be precisely detected even in a low illumination environment or an environment in which an obstacle such as glasses exists. When incorrect 3D information is provided to a user due to a crosstalk, a life-threatening situation such as a traffic accident may occur. Therefore, the object tracking apparatus 100 must be able to track the target object 150 in an input image captured in various environments, for example, a low illumination environment or an environment in which an obstacle such as glasses exists.

The camera 120 may capture the target object 150 and may provide the input image to the image processing apparatus 110. The image processing apparatus 110 may track the target object 150 in the input image and may determine coordinates of the target object 150. The camera 120 may be, for example, a single camera or a stereo camera. When the camera 120 is a single camera, the image processing apparatus 110 may extract 2D coordinates of the target object 150 from the input image, may combine the 2D coordinates with an interpupillary distance (IPD) of a user, and may determine 3D coordinates of the target object 150. When the camera 120 is a stereo camera, the image processing apparatus 110 may extract 2D coordinates of the target object 150 from input images acquired in at least two positions, and may determine 3D coordinates of the target object 150 using a triangulation scheme.

The camera 120 may generate a first-type input image that is of a first type and that is based on a light of a first wavelength band, and may generate a second-type input image that is of a second type and that is based on a light of a second wavelength band. The camera 120 may function as a visual camera that uses visible rays and as an IR camera that uses IR rays. For example, the camera 120 may be a hybrid camera that may use both visible rays and IR rays. For example, an IR cut filter may be removed from the camera 120, and the camera 120 may capture the target object 150 using visible rays in an environment in which visible rays are provided, and may capture the target object 150 using IR rays in an environment in which IR rays are provided. The camera 120 may be, for example, a hybrid type stereo camera.

The visual camera may be limited in its ability to track the target object 150 under a low illumination. For example, to track the target object 150 using the visual camera in a low illumination environment, a frame rate of the visual camera may be lowered or an aperture may be opened. In this example, due to a low frame rate, camera latency or image blurring may occur. The IR camera may also be used in the low illumination environment. However, when the IR camera is used, a problem of safety may occur due to continuous use of IR rays, white spots may appear around eyes due to glasses, or the accuracy of detecting the target object 150 may decrease in an environment in which strong external light exists.

Therefore, the camera 120 may properly operate as a visual camera or an IR camera depending on the circumstances. For example, when the image processing apparatus 110 fails to detect the target object 150 from an input image that is based on visible rays, the camera 120 may capture the target object 150 based on IR rays. Thus, when the camera 120 operates as an IR camera, the IR light source 130 may be activated for IR capturing, and the activated IR light source 130 may provide light of an IR wavelength band. Because the IR cut filter is removed from the camera 120, the camera 120 may capture the target object 150 based on IR rays. Also, when the image processing apparatus 110 determines that a reliability of the input image based on the visible rays has decreased, the camera 120 may capture the target object 150 based on IR rays.

Use of a visible-ray image under a high illumination is not necessarily efficient for tracking. Also, using of an IR-ray image under a low illumination is not necessarily efficient for tracking. For example, even under a low illumination, use of a visible-ray image may be efficient for tracking. Thus, it may be difficult to guarantee an accuracy of tracking by determining a wavelength band that is to be used by camera 120 based on an illumination value alone.

For example, the reliability of an input image may be measured using a reliability measurer that is trained to output the reliability of the input image, and a modality may be switched based on the reliability of the input image. In this example, the modality may refer to an operation or a device associated with a predetermined wavelength band. A high reliability of the input image may include a high reliability of a training process using the input image. For example, when a low reliability is measured using the reliability measurer, a modality may be switched to enhance the reliability of a training process. When the reliability measurer is used, the tracking accuracy may be enhanced, in comparison to simply depending on an illumination.

The object tracking apparatus 100 may be used to track eye positions of a driver for a 3D HUD of a vehicle, or to track eye positions of a viewer for a 3D display of a display device such as a television (TV) or a mobile device. Also, the object tracking apparatus 100 may be used to monitor a driver's viewpoint and a driver's gaze tracking status.

The object tracking apparatus 100 may detect the target object 150 in a detection mode, and may track the target object 150 in a tracking mode based on area information of the detected target object 150. For example, when an object is detected from a first frame, the object tracking apparatus 100 may generate detection information and may track the target object 150 in a second frame based on the detection information. In this example, the second frame may be a frame next to the first frame, and the detection information may include a detection area corresponding to the detected target object 150. When the object tracking apparatus 100 enters a tracking mode, the target object 150 may be detected using only a limited number of areas of the input image rather than all of the areas of the input image. Thus, resources to detect the target object 150 may be saved.

The object tracking apparatus 100 may use a detector that has been trained based on error data in the detection mode. The error data may refer to training data corresponding to a relatively high level of object detection difficulty. The detection performance of the detector may be enhanced by training the detector based on the error data. For example, the error data may include at least one of data obtained when a detection of the target object 150 is not completed and data obtained when another object is incorrectly detected as the target object 150, from among training data. The expression "detection of the target object 150 is not completed" may encompass any failure in the detection of the target object 150.

The object tracking apparatus 100 may use a tracker trained based on quality in the tracking mode. A quality measurer may classify input images based the quality of the input images. For example, the quality measurer may classify qualities of input images as one of a high quality, a medium quality, and a low quality. The quality of an input image may include a level of tracking difficulty. The tracker may include a first tracker trained to track the target object 150 in a high-quality input image, a second tracker trained to track the target object 150 in a medium-quality input image, and a third tracker trained to track the target object 150 in a low-quality input image. When the quality measurer measures the quality of an input image, a tracker corresponding to the measured quality may track the target object 150. When a tracker trained based on quality is used, the tracking accuracy may be enhanced.

Figure 2:
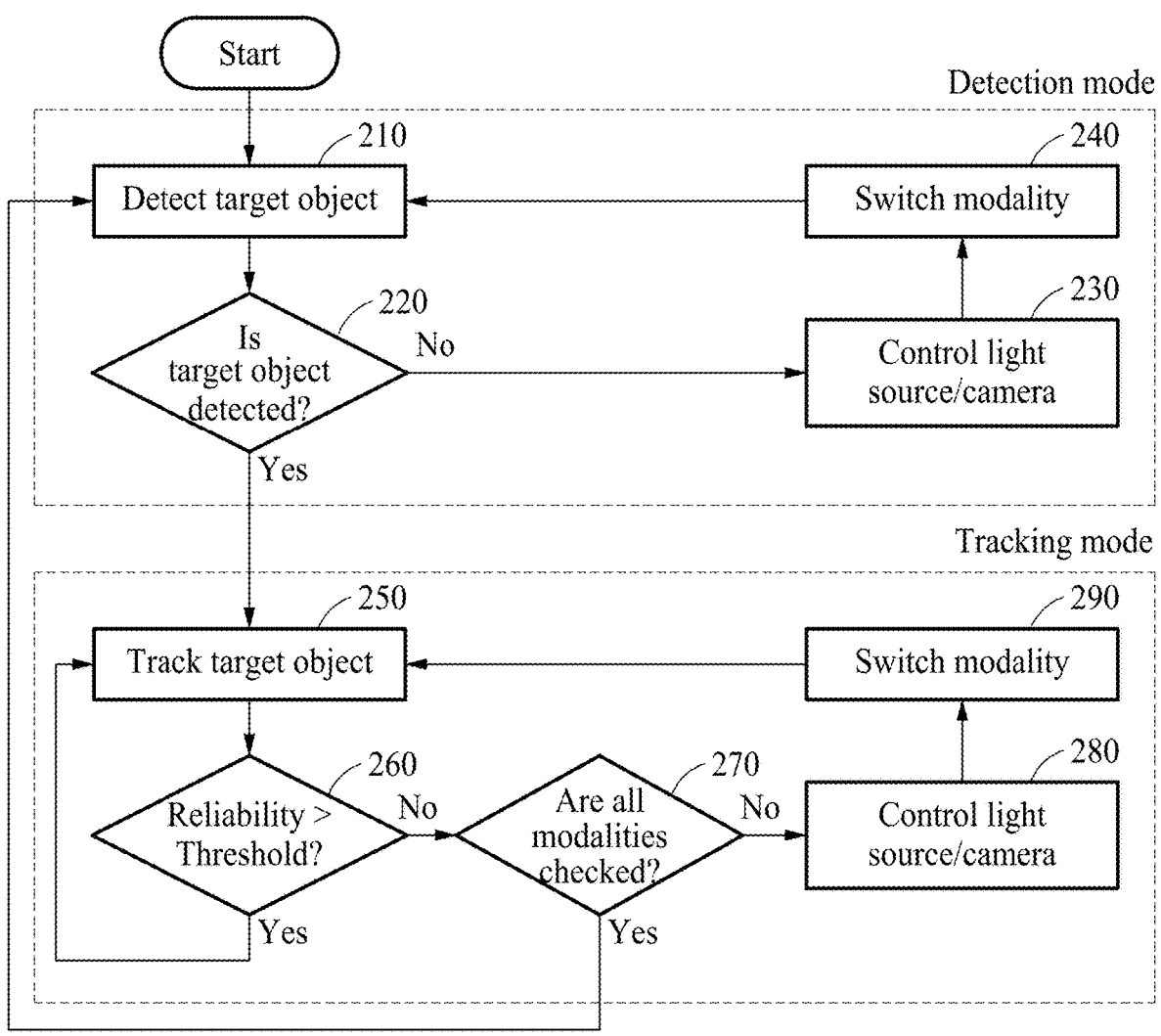
FIG. 2 is a flowchart illustrating an object tracking method according to an exemplary embodiment.

FIG. 2 is a flowchart illustrating an object tracking method according to an exemplary embodiment. In the following description, a wavelength band used by a visible-ray camera, that is, a band including a visible wavelength band may be referred to as a "first wavelength band," and a wavelength band used by an IR camera, that is, a band including an IR wavelength band may be referred to as a "second wavelength band." Also, an operation or a device associated with the first wavelength band may be referred to as a "first modality," and an operation or a device associated with the second wavelength band may be referred to as a "second modality."

The following description may be applied to both an example in which a camera configured to provide an input image is a single camera and an example in which the camera is a stereo camera. For example, when a single camera is used, the following description may be applicable to the single camera. When a stereo camera is used, the following description may be applicable to cameras of the stereo camera.

Referring to FIG. 2, in operation 210, an object tracking apparatus detects a target object from an input image based on a current modality. The current modality may be the first modality or the second modality. For example, when the current modality is the first modality, the object tracking apparatus may acquire a first-type input image that is based on light of the first wavelength band, and may detect a target object from the first-type input image. The current modality may be switched based on a predetermined condition in operation 240 or 290. Although the current modality is presumed to be the first modality in the following description, the following description is equally applicable to an example in which the current modality is the second modality.

In operation 220, the object tracking apparatus determines whether the target object is detected from the first-type input image. When the target object is detected from the first-type input image, an operating mode of the object tracking apparatus may be changed from a detection mode to a tracking mode, and operation 250 may be performed. When the target object is not detected from the first-type input image, operations 230 and 240 may be performed. Hereinafter, an example in which the target object is not detected from the first-type input image and an example in which the target object is detected from the first-type input image in operation 210 will be further described.

Example in which Target Object is not Detected from First-Type Input Image

When the target object is not detected from the first-type input image, the object tracking apparatus controls at least one of a camera and a light source in operation 230, and switches a modality in operation 240. For example, when the target object is not detected from the first-type input image, the object tracking apparatus may activate an IR light source, and may switch the current modality from the first modality to the second modality. Also, in operation 230, one or more of an aperture, a shutter speed, and an ISO of the camera may be adjusted.

In the first modality, an operation based on the first-type input image that is based on the light of the first wavelength band may be performed. In the second modality, an operation based on a second-type input image that is based on a light of the second wavelength band may be performed. For example, when the current modality is switched from the first modality to the second modality in operation 240, the object tracking apparatus may acquire the second-type input image and may detect the target object from the second-type input image in operation 210. The object tracking apparatus may determine whether the target object is detected from the second-type input image in operation 220. When the target object is detected from the second-type input image, the operating mode may be changed from the detection mode to the tracking mode, and operation 250 may be performed. When the target object is not detected from the second-type input image, the object tracking apparatus may repeat operations 230 and 240.

When the target object is detected from the second-type input image, the object tracking apparatus may track the target object, in operation 250, in the second-type input image based on detection information of the target object. The detection information may be generated in response to the target object being detected from the second-type input image in operation 210. The object tracking apparatus may measure the reliability of the second-type input image by comparing an image stored in a second database (DB) to the second-type input image. The reliability of the image is then compared to a second threshold. In operation 260. When the reliability of the second-type input image is lower than the second threshold, operations 270, 280 and 290 may be performed, as discussed in further detail below. A threshold compared to a reliability of the first-type input image may be referred to as a "first threshold," and a threshold compared to the reliability of the second-type input image may be referred to as a "second threshold."

When the current modality is switched from the second modality to the first modality based on a result indicating that the reliability of the second-type input image is lower than the second threshold in operation 290, the object tracking apparatus may track the target object in the first-type input image in operation 250. The images stored in the second DB may have a reliability higher than a predetermined threshold, and may include at least one second reference image acquired based on the light of the second wavelength band. Thus, the reliability of the second-type input image may be determined to increase as its similarity to the at least one second reference image increases.

The object tracking apparatus may track the target object based on the detection information. The detection information may be generated in response to the target object being detected from the second-type input image in operation 210, as described above. For example, the detection information may be used regardless of the modality in which the detection information is generated. For example, when detection information is generated in the second modality, the generated detection information may also be used in the first modality. A detection area in the detection information may be a predetermined area, because the detection information may be used regardless of the current modality when input images have equal sizes.

Example in which Target Object is Detected from First-Type Input Image

When the target object is detected from the first-type input image, the object tracking apparatus may generate detection information including a detection area. In operation 250, the object tracking apparatus may acquire a next frame of the first-type input image and may track the target object in the acquired frame. The object tracking apparatus may track the target object based on the detection information.

The object tracking apparatus may measure the reliability of the first-type input image by comparing an image stored in a first DB to the first-type input image. The reliability of the first-type input image may then be compared to the first threshold, in operation 260. The image stored in the first DB may have a reliability higher than a predetermined threshold, and may include at least one first reference image acquired based on the light of the first wavelength band. Thus, the reliability of the first-type input image may be determined to increase as its similarity to the at least one first reference image increases.

When the reliability of the first-type input image is higher than the first threshold, operation 250 may be performed again. For example, when the reliability of the first-type input image is higher than the first threshold, the tracking mode may be maintained based on the first modality. The object tracking apparatus may acquire a next frame of the first-type input image and may track the target object in the acquired frame. When a high reliability of the first-type input image continues to be measured, the object tracking apparatus may continue to acquire consecutive frames of the first-type input image and may continue to track the target object in the first-type input image.

When the reliability of the first-type input image is lower than the first threshold, it is determined, in operation 270, whether all modalities have been checked, and operations 280 and 290 may be performed, as discussed in further detail below. All the modalities may include the first modality and the second modality. For example, despite a low reliability based on the first modality, the tracking mode may be performed in the second modality instead of being immediately released. When low reliability is measured in both the first modality and the second modality, the tracking mode may be released and the detection mode may be performed again. In other words, when all the modalities are determined to be checked in operation 270, the detection mode may be performed again in operation 210. When fewer than all of the modalities have been checked, operations 280 and 290 may be performed.

In operation 280, the object tracking apparatus may control at least one of the light source and the camera, in operation 290, the object tracking apparatus may switch the modality in operation 290. For example, when the target object is not detected from the first-type input image, the object tracking apparatus may activate an IR light source in operation 280 and may switch the current modality from the first modality to the second modality in operation 290. The above description of operations 230 and 240 may also be applicable to operations 280 and 290.

When the current modality is switched from the first modality to the second modality in operation 290, the object tracking apparatus may acquire a next frame from the second-type input image and may track the target object in the acquired frame in operation 250. The object tracking apparatus may track the target object based on the detection information. The detection information may be generated in response to the target object being detected in the first-type input image in operation 210, as described above.

The object tracking apparatus may measure the reliability of the second-type input image by comparing an image stored in the second DB to the second-type input image. The reliability of the second-type input image may then be compared to the second threshold in operation 260. When the reliability of the second-type input image is lower than the second threshold, operation 270 may be performed. When both the first modality and the second modality have been checked, the tracking mode may be released and the detection mode may be repeated in operation 210. When the detection mode is performed, the current modality may be maintained or switched. In the above example, the object tracking apparatus may continue to operate in the second modality, or may operate in the first modality by switching the current modality from the second modality to the first modality. Thus, in operation 210, the object tracking apparatus may detect the target object from the first-type input image or the second-type input image based on the current modality.

Figure 3:
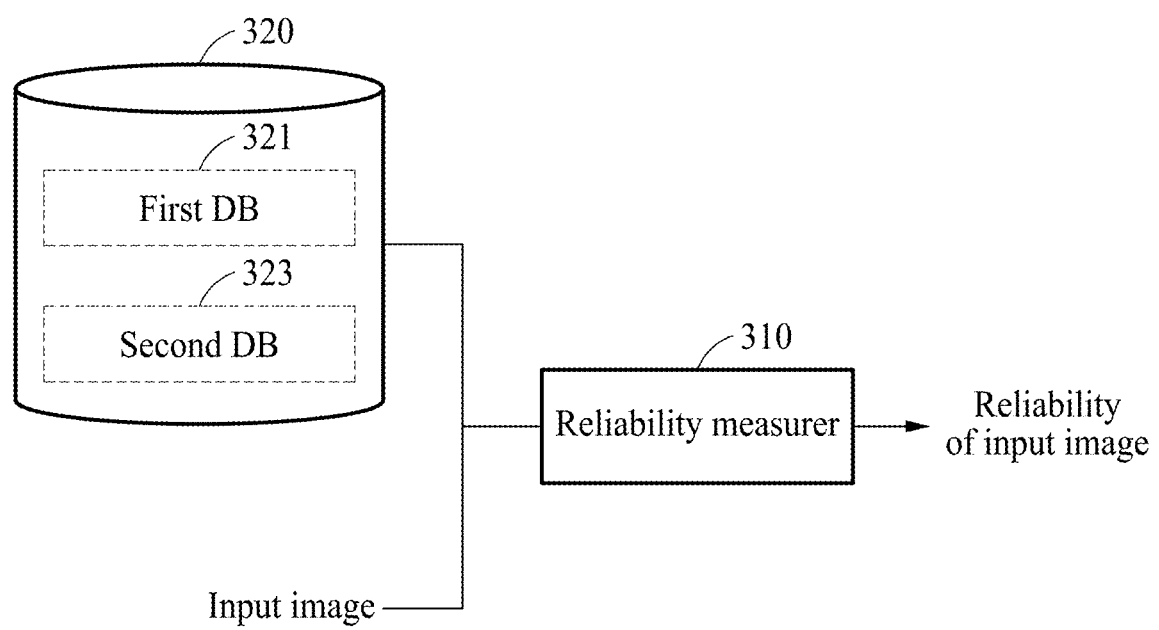
FIG. 3 is a diagram illustrating an operation of a reliability measurer according to an exemplary embodiment.

FIG. 3 is a diagram illustrating an operation of a reliability measurer 310 according to an exemplary embodiment. Referring to FIG. 3, the reliability measurer 310 may compare an input image and an image stored in a DB 320 and may thereby determine and output a reliability of the input image. An object tracking apparatus may measure the reliability of the input image using the reliability measurer 310, or may directly perform an operation of the reliability measurer 310 that will be described below.

The DB 320 may include a first DB 321 and a second DB 323. When the input image corresponds to a first modality, the reliability measurer 310 may compare the input image and an image stored in the first DB 321. When the input image corresponds to a second modality, the reliability measurer 310 may compare the input image and an image stored in the second DB 323. The one or more images stored in the first DB 321 may have a reliability higher than a predetermined criterion and may include at least one first reference image acquired based on a light of a first wavelength band. The one or more images stored in the second DB 323 may have a reliability higher than a predetermined threshold and may include at least one second reference image acquired based on a light of a second wavelength band. For example, the DB 320 may include reference images classified with a high reliability by a tracker trained based on a quality.

Figure 4:
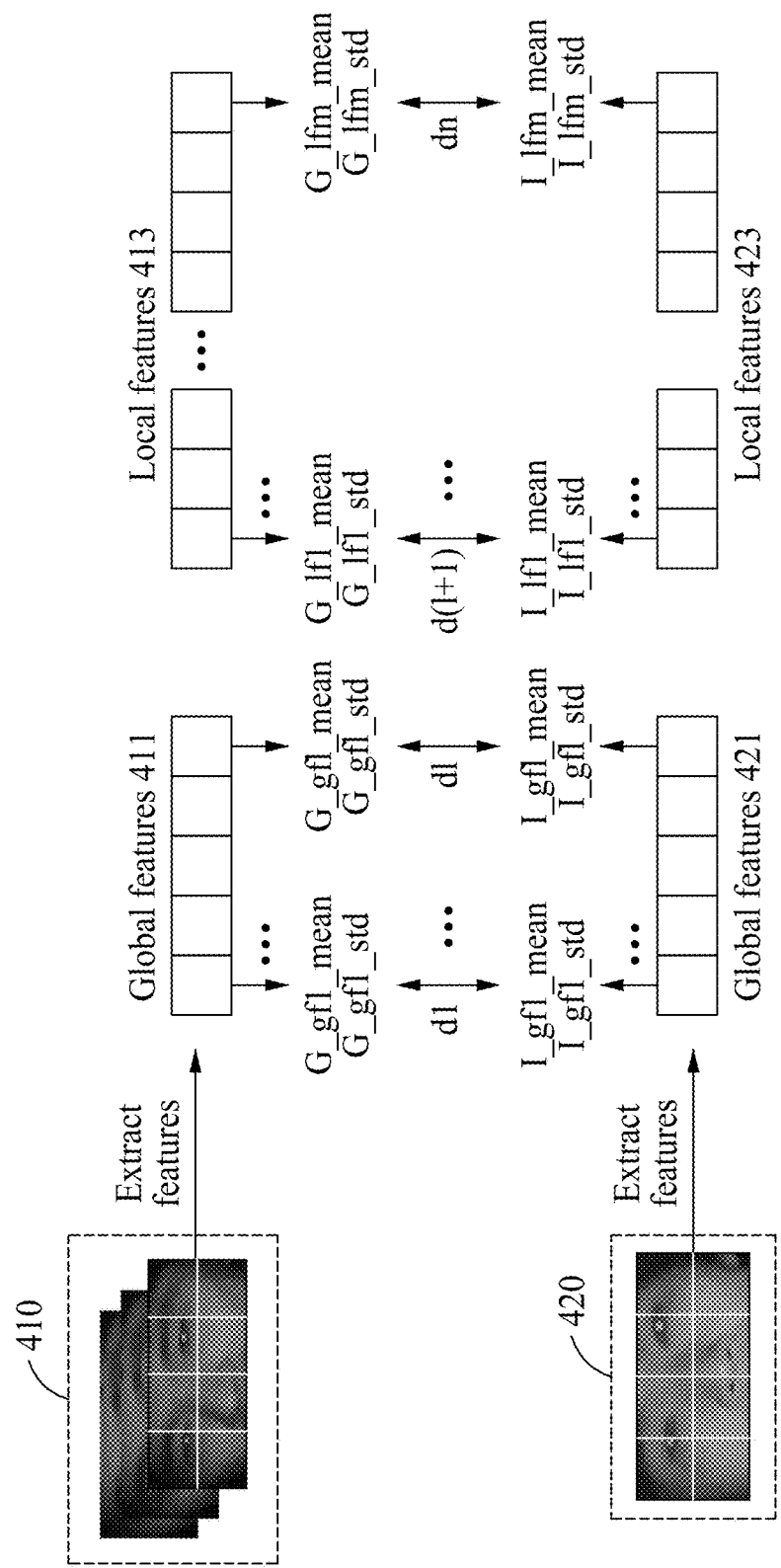
FIG. 4 is a diagram illustrating a process of measuring a reliability of an input image according to an exemplary embodiment.

FIG. 4 is a diagram illustrating a process of measuring a reliability of an input image according to an exemplary embodiment. A reference image 410 may be acquired from the first DB or the second DB based on the modality of an input image 420. For example, when the input image 420 is of a second type, the reference image 410 may be acquired from the second DB. A number of reference images 410 stored in the first and second DBS may be determined based on, for example, a required tracking accuracy or a desired performance of the object tracking apparatus.

The object tracking apparatus may extract global features 411 and local features 413 from the reference images 410, and may extract global features 421 and local features 423 from the input image 420. For example, it is assumed that a number of global features 411 and 421 is denoted by "l," that a number of local features 413 and 423 is denoted by "m" and that "l+m=n." In this example, n denotes a total number of both global and local features extracted from the reference images 410 and a number of features extracted from the input image 420. Also, l, m and n may be natural numbers.

The object tracking apparatus may calculate a mean value (mean) and a standard value (std) in association with each of the global features 411 and 421 and each of the local features 413 and 423. For example, the object tracking apparatus may calculate mean values G_gf1_mean through G_gfl_mean and standard values G_gf1_std through G_gfl_std in association with the global features 411, and may calculate mean values I_gf1_mean through I_gfl_mean and standard values I_gf1_std through I_gfl_std in association with the global features 421. Also, the object tracking apparatus may calculate mean values G_lf1_mean through G_lfm_mean and standard values G_lf1_std through G_lfm_std in association with the local features 413, and may calculate mean values I_lf1_mean through I_lfm_mean and standard values I_lf1_std through I_lfm_std in association with the local features 423.

The object tracking apparatus may calculate a distance between features based on the calculated mean values and the calculated standard values. For example, the distance may be calculated using Equation 1, shown below.

$$d\_i = \begin{cases} \left| \dfrac{I\_gfi\_mean}{I\_gfi\_std} - \dfrac{G\_gfi\_mean}{G\_gfi\_std} \right|, & 1 \leq i \leq l \\ \left| \dfrac{I\_lfi\_mean}{I\_lfi\_std} - \dfrac{G\_lfi\_mean}{G\_lfi\_std} \right|, & l+1 \leq i \leq n \end{cases} \quad \text{[Equation 1]}$$

In Equation 1, d_i denotes a distance between an i-th feature of a reference image and an i-th feature of an input image, I_gfi_mean denotes a mean value of an i-th global feature of the input image, I_gfi_std denotes a standard value of the i-th global feature of the input image, G_gfi_mean denotes a mean value of an i-th global feature of the reference image, and G_gfi_std denotes a standard value of the i-th global feature of the reference image. Also, I_lfi_mean denotes a mean value of an i-th local feature of the input image, I_lfi_std denotes a standard value of the i-th local feature of the input image, G_lfi_mean denotes a mean value of an i-th local feature of the reference image, and G_lfi_std denotes a standard value of the i-th local feature of the reference image.

The object tracking apparatus may calculate scores of features based on a distance between features. For example, a score of a feature may be calculated using Equation 2 shown below.

$$F\_score\_i = \dfrac{d\_i - d\_i\_min}{d\_i\_max - d\_i\_min} * 100 \quad \text{[Equation 2]}$$

In Equation 2, F_score_i denotes a score of an i-th feature, d_i denotes a distance between an i-th feature of a reference image and an i-th feature of an input image, d_i_max denotes a maximum value of the distance d_i, and d_i_min denotes a minimum value of the distance d_i.

The object tracking apparatus may calculate a reliability of an input image using a weighted average of scores of features. For example, the reliability of the input image may be calculated using Equation 3 shown below.

$$S = \sum_{k=1}^{n} \frac{w_k * \text{F\_score\_k}}{n} \quad \text{[Equation 3]}$$

In Equation 3, S denotes a reliability of an input image, F_score_k denotes a k-th feature score, $w_k$ denotes a k-th weight, n denotes a number of extracted features, and k denotes an operation index. The object tracking apparatus may measure the reliability of the input image using the process of FIG. 4.

Figure 5:
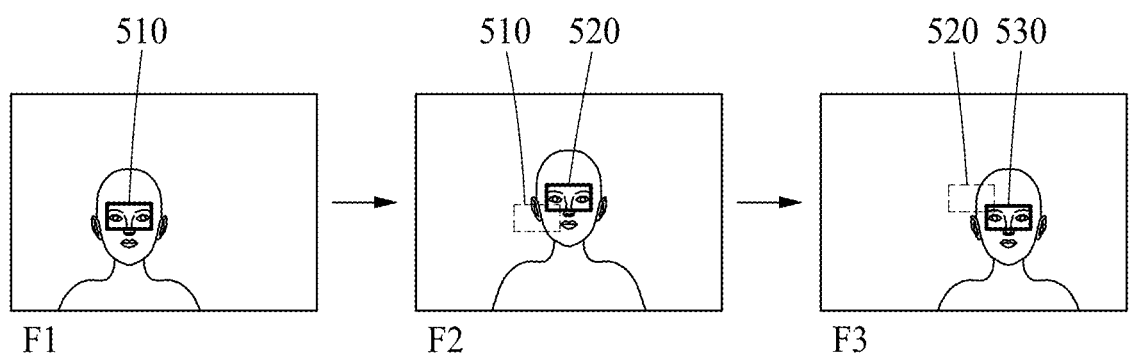
FIG. 5 is a diagram illustrating a process of tracking an object using a tracking area according to an exemplary embodiment.

FIG. 5 is a diagram illustrating a process of tracking an object using a tracking area according to an exemplary embodiment. To track a target object, an object tracking apparatus may determine a detection area estimated to correspond to the target object in a frame F1. A location and a size of the detection area may be specified. For example, the size of the detection area may be set in advance, and the location of the detection area may be determined by the object tracking apparatus.

The object tracking apparatus may align the target object by extracting feature points of the target object from the detection area in the frame F1. For example, the object tracking apparatus may extract feature points representing a shape of the target object from a portion of an image that corresponds to the detection area from the frame F1, to identify a geometric structure of the target object. When the target object is aligned, the object tracking apparatus may determine a tracking area 510 used to track the target object, based on the extracted feature points. For example, the object tracking apparatus may determine, as a tracking area, an area that includes the feature points on a central portion of the area. The object tracking apparatus may track a target object in a frame F2 based on the tracking area 510. When a reliability of the frame F1 is higher than a threshold, an object detection may be omitted in the frame F2.

A target object in the frame F2 may be located further upward and further rightward in comparison to a location of the target object in the frame F1. The object tracking apparatus may extract feature points of the target object from the tracking area 510 in the frame F2. The object tracking apparatus may determine a new tracking area 520 in the frame F2 based on the feature points extracted from the tracking area 510. For example, the object tracking apparatus may determine, as the tracking area 520, an area including the feature points extracted from the tracking area 510 in a central portion of the area. Similarly to the frame F2, in the frame F3, feature points of the target object may be extracted from the tracking area 520, and a new tracking area 530 may be determined. As described above, when a reliability of an input image is higher than a threshold, the object tracking apparatus may continue to track the target object in a tracking mode.

The object tracking apparatus may minimize the use of a detector during tracking of a target object. Due to the consumption of computing resources by a detecting operation of the detector, the use of the detector may be minimized using the object tracking apparatus, as described. Since a detector scans all areas of an input image to detect a target object, a large amount of computing resources may be consumed for the detection operation of the detector.

The object tracking apparatus may output location information of a target object included in an input image while tracking the target object. The location information of the target object may include, for example, eye positions of a user. For example, the object tracking apparatus may track a target object in a plurality of frames included in the input image, and may output the eye positions of a user for each of the frames. Eye positions may be specified by 2D or 3D coordinates.

Figure 6:
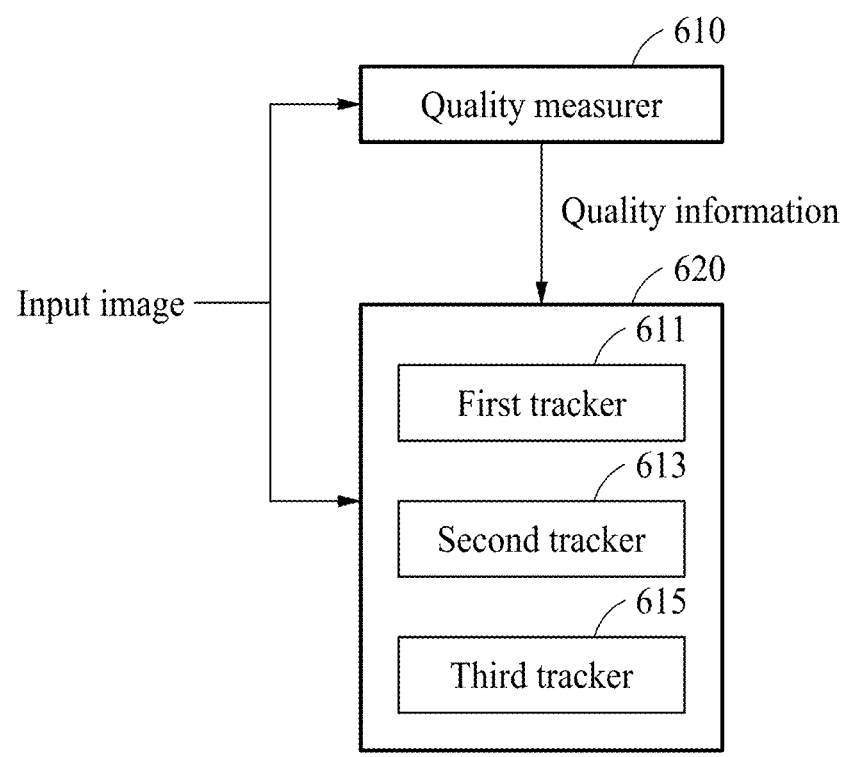
FIG. 6 is a block diagram illustrating a tracker based on a quality measurement according to an exemplary embodiment.

FIG. 6 is a block diagram illustrating a tracker 620 using a quality measurement according to an exemplary embodiment. Referring to FIG. 6, the tracker 620 includes three sub trackers: a first tracker 611, a second tracker 613 and a third tracker 615. For convenience of description, the tracker 620 includes three sub-trackers in the following description, and as illustrated in FIG. 6, however, the tracker 620 may include two sub-trackers or at least four sub-trackers. Sub-trackers may be trained for use with images with different qualities. For example, the first tracker 611 may be trained for use with a high-quality image, the second tracker 613 may be trained for use with a medium-quality image, and the third tracker 615 may be trained for use with a low-quality image.

An object tracking apparatus may measure a quality of an input image, and may transmit the input image and quality information of the input image to the tracker 620. The object tracking apparatus may measure the quality of the input image using a quality measurer 610. The tracker 620 may select a sub-tracker corresponding to the quality information of the input image from among multiple sub-trackers, and may provide the input image to the selected sub-tracker. For example, when an input image has a high quality, the tracker 620 may provide the input image to the first tracker 611 trained for use with a high-quality image. When the input image is provided to the sub-tracker, the sub-tracker may track a target object in the input image.

Figure 7:
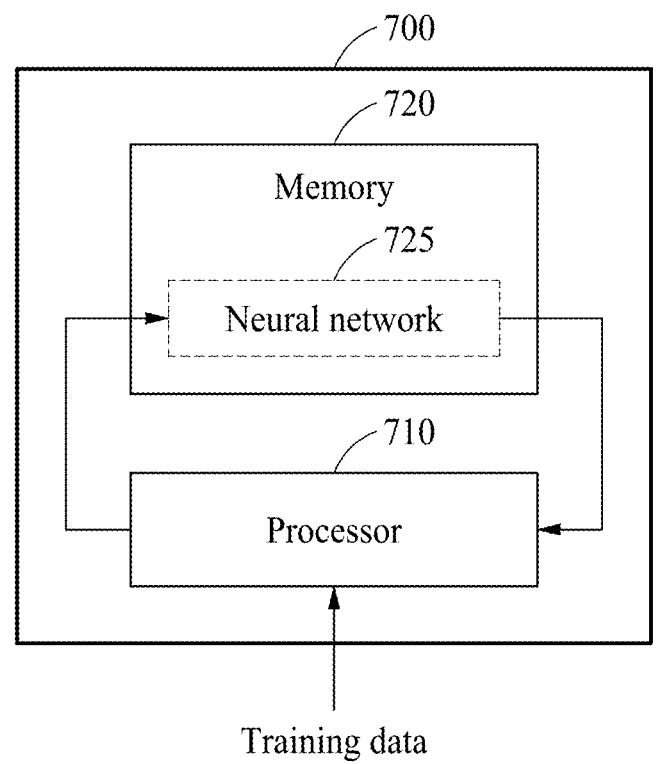
FIG. 7 is a block diagram illustrating a training apparatus according to an exemplary embodiment.

FIG. 7 is a block diagram illustrating a training apparatus 700 according to an exemplary embodiment. Referring to FIG. 7, the training apparatus 700 includes a processor 710 and a memory 720. The memory 720 may include a neural network 725, and may store instructions readable by the processor 710. The neural network 725 may correspond to a detector, a tracker, a reliability measurer, and a quality measurer. When the instructions are executed by the processor 710, the processor 710 may train the neural network 725. The training of the neural network 725 may include training of parameters of the neural network 725, updating the neural network 725, and/or updating parameters of the neural network 725. The memory 720 may store data required for a training process and for a neural network 725 that is completely trained.

Figure 8:
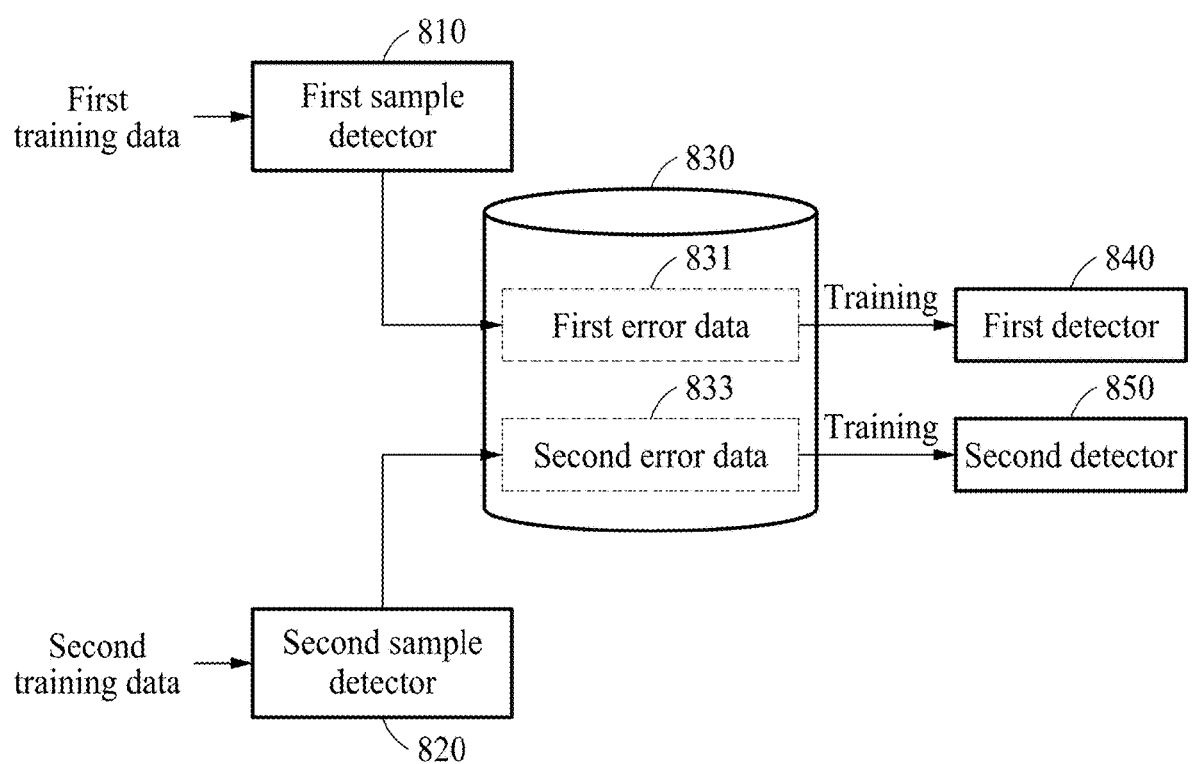
FIG. 8 is a diagram illustrating a process of training detectors according to an exemplary embodiment.

FIG. 8 is a diagram illustrating a training process of detectors according to an exemplary embodiment. Referring to FIG. 8, a first sample detector 810 may detect a target object from first training data, and first error data 831 may be formed based on an output of the first sample detector 810. The first training data may include images that are based on a first wavelength band (hereinafter, referred to as "first wavelength band-based images"), and the first sample detector 810 may be trained in advance to detect a target object from the first wavelength band-based images. A second sample detector 820 may detect a target object from second training data, and second error data 833 may be formed based on an output of the second sample detector 820. The second training data may include images that are based on a second wavelength band (hereinafter, referred to as "second wavelength band-based images"), and the second sample detector 820 may be trained in advance to detect a target object from the second wavelength band-based images.

An error DB 830 may store the first error data 831 and the second error data 833. Error data may refer to training data corresponding to a relatively high level of object detection difficulty, and the detection performance of a detector may be enhanced by training the detector based on the error data. For example, the error data may include at least one of data obtained when the detection of a target object is not completed and data obtained when another object is incorrectly detected as a target object, from among training data. The first error data 831 may include an image with a relatively high level of object detection difficulty from among the first wavelength band-based images, and the second error data 833 may include an image with a relatively high level of object detection difficulty from among the second wavelength band-based images.

A first detector 840 may be trained based on the first error data 831, and a second detector 850 may be trained based on the second error data 833. Thus, the first detector 840 may be trained to have the capability of detecting a target object from an image with a relatively high level of object detection difficulty from among the first wavelength band-based images, and the second detector 850 may be trained to have the capability of detecting a target object from an image with a relatively high level of object detection difficulty from among the second wavelength band-based images. The object tracking apparatus may use the first detector 840 to detect a target object from a first-type input image, and may use the second detector 850 to detect a target object from a second-type input image. Thus, the object tracking apparatus may detect a target object from an input image using detectors trained for each of a number of different modalities.

Figure 9:
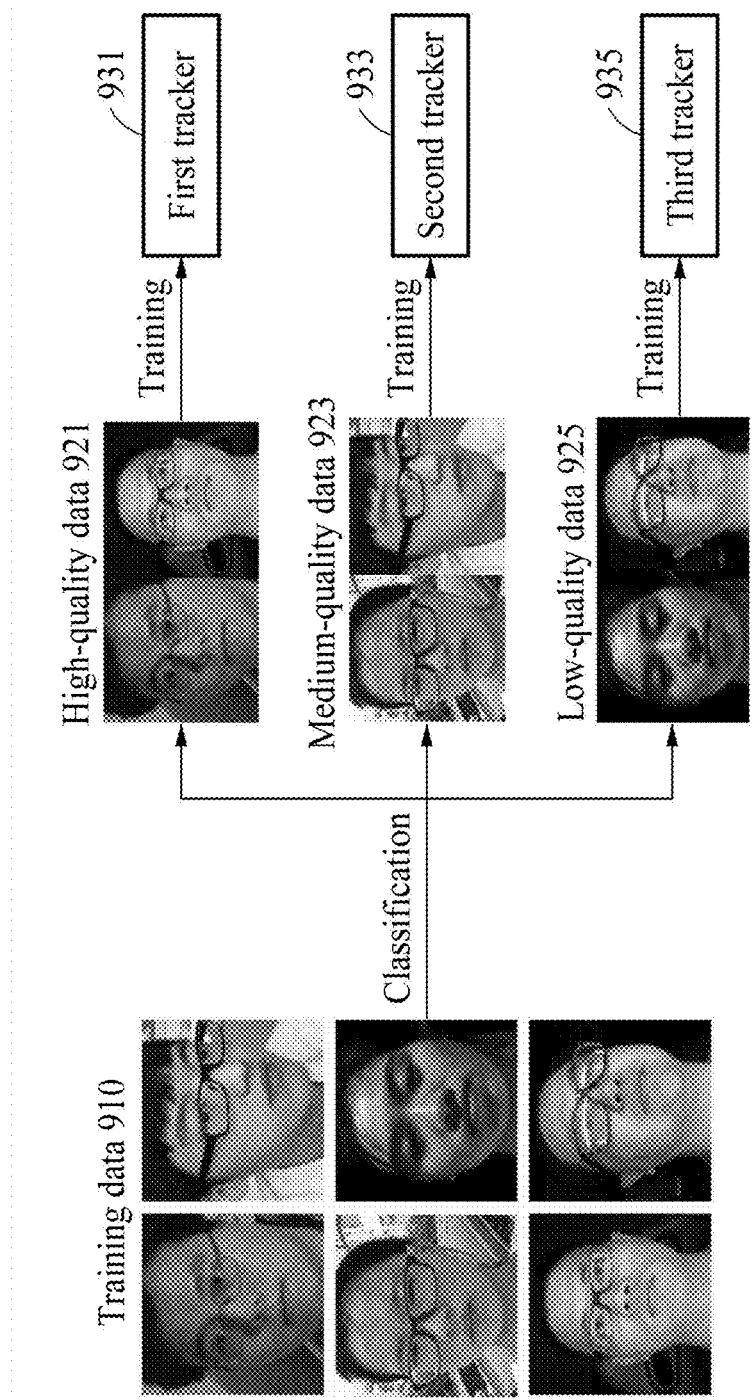
FIG. 9 is a diagram illustrating a process of training a tracker to track a target object in an input image that is based on a light of a first wavelength band according to an exemplary embodiment.

FIG. 9 is a diagram illustrating a process of training a tracker to track a target object in an input image that is based on a light of a first wavelength band according to an exemplary embodiment. Referring to FIG. 9, training data 910 may be classified as high-quality data 921, medium-quality data 923, or low-quality data 925. The training data 910 may include images captured using light of the first wavelength band. The training data 910 may be classified by a quality measurer. For example, an image that clearly represents eyes may be classified as high-quality data 921, and an image that less clearly represents eyes may be classified as medium-quality data 923. Also, an image captured under a low illumination, or an image that unclearly represents centers of eyes may be classified as low-quality data 925.

A first tracker 931 may be trained based on the high-quality data 921, a second tracker 933 may be trained based on the medium-quality data 923, and a third tracker 935 may be trained based on the low-quality data 925. Each of the first tracker 931 through the third tracker 935 may be referred to as a sub-tracker, and the first tracker 931 through the third tracker 935 that have been completely trained may respectively correspond to the first tracker 611 through the third tracker 615 of FIG. 6.

For convenience of description, a tracker including sub trackers that have been trained based on particular qualities of data may be referred to as a "multi-model." Such a multi-model may exhibit tracking performance that is higher than that of a single model. When the first DB 321 of FIG. 3 is formed based on a multi-model, the reliability of an input image may be measured with a high performance. For example, a multi-model may test a predetermined training data set and classify the training data set for each test error. When the training data set is divided into a first group with a small amount of error, a second group with a medium amount of error, or a third group with a large amount of error, the first DB 321 may store the data, included in the first group, having a small amount of error.

Figure 10:
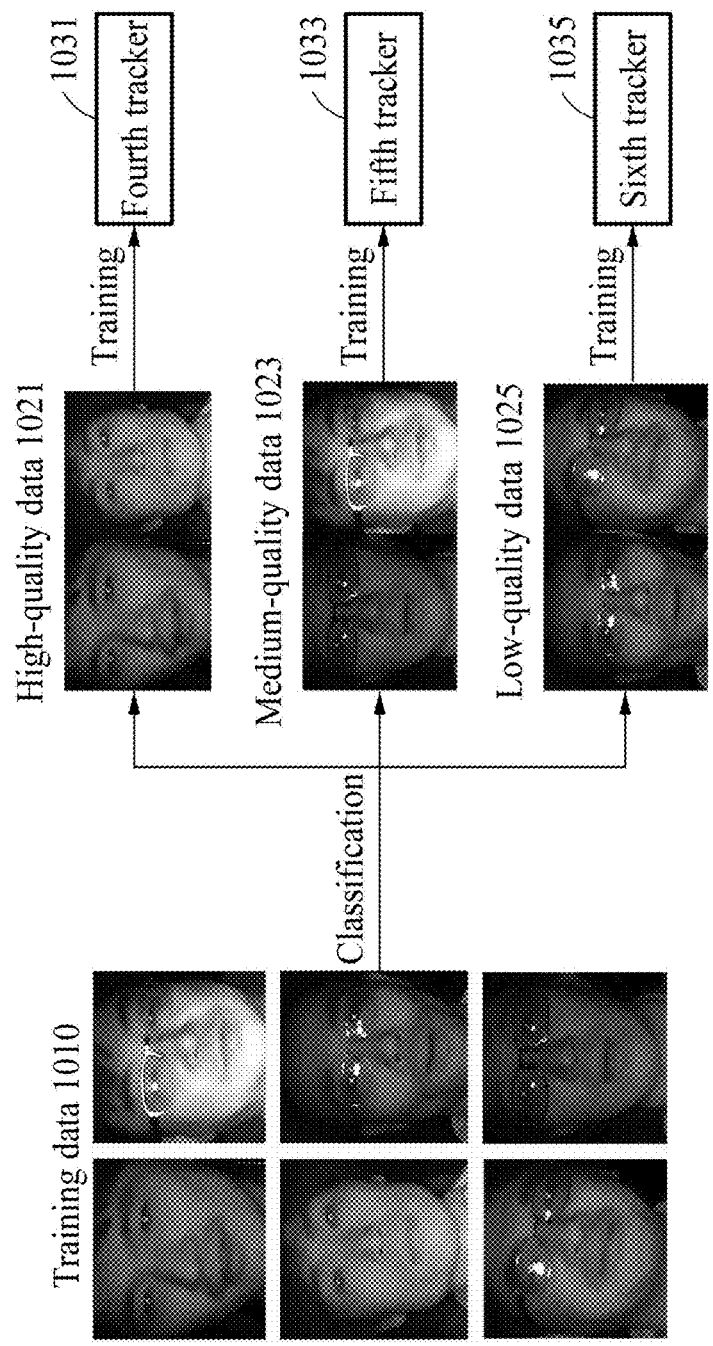
FIG. 10 is a diagram illustrating a process of training a tracker to track a target object in an input image that is based on a light of a second wavelength band according to an exemplary embodiment.

FIG. 10 is a diagram illustrating a process of training a tracker to track a target object in an input image that is based on a light of a second wavelength band according to an exemplary embodiment. Referring to FIG. 10, training data 1010 may be classified as high-quality data 1021, medium-quality data 1023, or low-quality data 1025. The training data 1010 may include images captured using light of the second wavelength band. The training data 1010 may be classified by a quality measurer. For example, an image that clearly represents eyes may be classified as high-quality data 1021, and an image that includes a weak reflection from glasses or that less clearly represents eyes may be classified as medium-quality data 1023. Also, an image that includes a strong reflection from glasses or that unclearly represents centers of eyes may be classified as low-quality data 1025.

A fourth tracker 1031 may be trained based on the high-quality data 1021, a fifth tracker 1033 may be trained based on the medium-quality data 1023, and a sixth tracker 1035 may be trained based on the low-quality data 1025. The second DB 323 of FIG. 3 may be formed based on a multi-model that includes the fourth tracker 1031 through the sixth tracker 1035. For example, the multi-model may test a predetermined training data set and divide the training data set into a fourth group with a small amount of error, a fifth group with a medium amount of error and a sixth group with a large amount of error, and the second DB 323 may store the data include in the fourth group.

Figure 11:
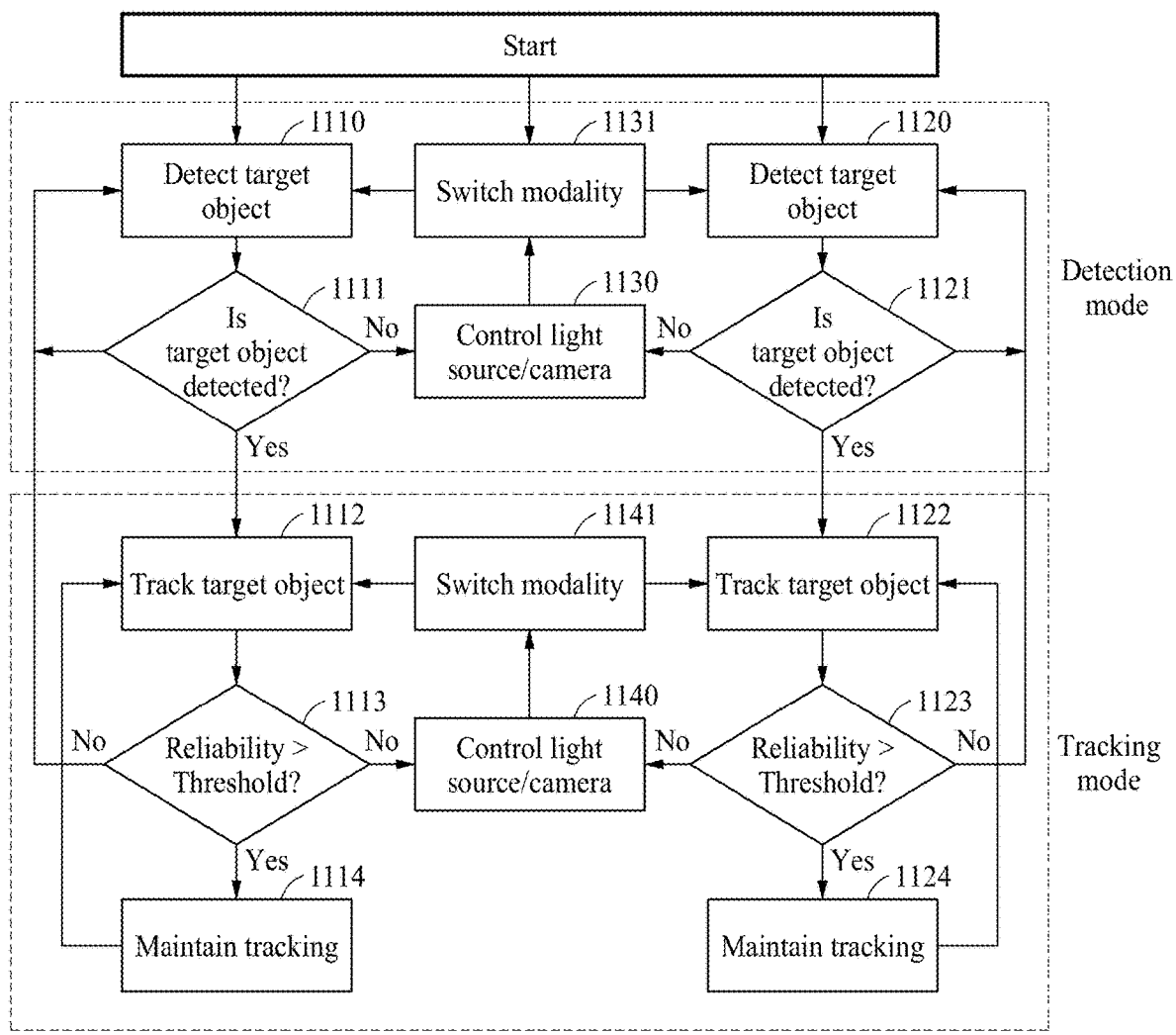
FIG. 11 is a flowchart illustrating an object tracking method using a stereo camera according to an exemplary embodiment.

FIG. 11 is a flowchart illustrating an object tracking method using a stereo camera according to an exemplary embodiment. The stereo camera may generate a first input image of a first type using a first camera, and may generate a second input image of the first type using a second camera. For example, the first camera and the second camera may generate a first input image of a first type and a second input image of the first type using light of a first wavelength band in a first modality. Operations 1110, 1111, 1112, 1113 and 1114 may be performed based on the first input image, and operations 1120, 1121, 1122, 1123 and 1124 may be performed based on the second input image. Operations 1110 through 1114 and operations 1120 through 1124 may be synchronized with each other. An example in which a current modality is the first modality will be described below.

In operation 1110, an object tracking apparatus acquires the first input image and detects a target object from the first input image. In operation 1120, the object tracking apparatus acquires the second input image and detects a target object from the second input image. In operations 1111 and 1121, the object tracking apparatus determines whether the target object is detected. When the target object is detected, operations 1112 and 1122 may be performed. When the target object is not detected, operations 1130 and 1131 may be performed. When the target object is not detected from either the first input image or the second input image, operations 1130 and 1131 may be performed. In operations 1130 and 1131, the object tracking apparatus controls at least one of a light source and a camera, and switches a modality.

In operation 1112, the object tracking apparatus acquires a next frame of the first input image, and tracks the target object in the next frame of the first input image. In operation 1122, the object tracking apparatus acquires a next frame of the second input image, and tracks the target object in the next frame of the second input image. The object tracking apparatus may track the target object based on detection information.

In operations 1113 and 1123, the object tracking apparatus measures a reliability of each of the first input image and the second input image, and compares the measured reliability to a threshold. When the reliability is higher than the threshold, operations 1114 and 1124 may be performed. When the reliability is lower than the threshold, operations 1140 and 1141 may be performed. When either a reliability of the first input image or a reliability of the second input image is lower than the threshold, operations 1140 and 1141 may be performed. When the reliability lower than the threshold is measured and when all modalities are checked, operations 1110 and 1120 may be performed. The above description of FIG. 2 may also be applicable to the object tracking method of FIG. 11.

Figure 12:
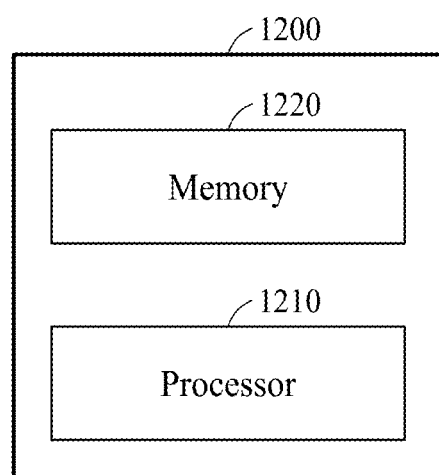
FIG. 12 is a block diagram illustrating an image processing apparatus according to an exemplary embodiment.

FIG. 12 is a block diagram illustrating an image processing apparatus 1200 according to an exemplary embodiment. Referring to FIG. 12, the image processing apparatus 1200 includes a processor 1210 and a memory 1220. The memory 1220 may include data for object tracking, and instructions readable and executable by the processor 1210. The memory 1220 may include software for enabling the processor or implement a detector, a tracker, a reliability measurer and a quality measurer that are completely trained. When the instructions in the memory 1220 are executed by the processor 1210, the processor 1210 may perform the operations for object tracking. For example, the processor 1210 may detect a target object from a first-type input image that is based on a light of a first wavelength band. When the target object is detected from the first-type input image, the processor 1210 may track the target object in the first-type input image based on detection information of the target object. The processor 1210 may measure a reliability of the first-type input image by comparing the first-type input image to a first DB. When the reliability of the first-type input image is lower than a first threshold, the processor 1210 may track the target object in a second-type input image based on the detection information. The second-type input image may be based on a light of a second wavelength band. The above description of FIGS. 1 through 11 is also applicable to the image processing apparatus 1200.

The exemplary embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

While this disclosure includes exemplary embodiments, it will be apparent to one of ordinary skill in the art that various changes in form and details may be made in these exemplary embodiments without departing from the spirit and scope of the claims and their equivalents. The exemplary embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An eye tracking method comprising:
  tracking user eyes in a first modality that is based on light in a first wavelength band;
  switching a modality of tracking the user eyes from the first modality to a second modality based on a result from a neural network trained to output a reliability of an image input to the neural network, the second modality is based on light in a second wavelength band, different from the first wavelength band; and tracking the user eyes in the second modality.

2. The eye tracking method of claim 1, wherein the switching of the modality is performed based on a reliability of a first-type input image used in the first modality.

3. The eye tracking method of claim 2, wherein the reliability of the first-type input image is measured by using the neural network.

4. The eye tracking method of claim 1, further comprising controlling an IR light source in response to the switching of the modality.

5. An eye tracking method comprising:
tracking user eyes in a first modality that is based on light in a first wavelength band;
switching a modality of tracking the user eyes from the first modality to a second modality the second modality is based on light in a second wavelength band, different form the first wavelength band; and
tracking the user eyes in the second modality,
wherein the tracking the user eyes in the first modality comprising:
determining a detection box corresponding to the user eyes in a first frame of an input image by scanning entire area of the first frame;
tracking the user eyes in a second frame of the input image by using information on the detection box without scanning entire area of the second frame.

6. The eye tracking method of claim 1, wherein the switching of the modality is performed depending on driving situations.

7. The eye tracking method of claim 1, wherein the first wavelength band comprises visible light and the second wavelength band comprises IR light.

8. The eye tracking method of claim 1, wherein both of the first-type input image of the first modality and a second-type input image of the second modality are obtained by using a camera generating the first-type input image and the second-type input image without an IR cut filter.

9. An eye tracking method comprising:
determining whether user eyes can be detected in a first modality that is based on light in a first wavelength band;
if it is determined that the user eyes can be detected in the first modality:
tracking the user eyes using a first-type input image of the first modality based on detection information of the user eyes;
switching a modality of tracking the user eyes from the first modality to a second modality, the second modality is based on light in a second wavelength band, different from the first wavelength band; and
if it is determined that the user eyes cannot be detected in the first modality:
detecting a target object in the second modality,
wherein the first wavelength band comprises visible light band and the second wavelength band comprises IR light band, and wherein both of the first-type input image of the first modality and a second-type input image of the second modality are obtained by using a camera generating the first-type input image and the second-type input image without an IR cut filter.

10. The eye tracking method of claim 9, wherein the switching of the modality is performed based on a reliability of a first-type input image used in the first modality, and
wherein the reliability of the first-type input image is measured by using the neural network.

11. The eye tracking method of claim 9, further comprising controlling an IR light source in response to the switching of the modality.

12. The eye tracking method of claim 9, wherein the switching of the modality is performed depending on driving situations.

13. An eye tracking apparatus comprising:
a memory storing instructions; and
a processor, which, upon executing the instructions is configured to:
track user eyes in a first modality that is based on light in a first wavelength band;
switch a modality of tracking the user eyes from the first modality to a second modality based on a result from a neural network trained to output a reliability of an image inputted to the neural network, the second modality is based on light in a second wavelength band, different from the first wavelength band; and
track the user eyes in the second modality.

14. The eye tracking method of claim 13, wherein the processor is further configured to switch the modality based on a reliability of a first-type input image used in the first modality.

15. The eye tracking method of claim 14, wherein the processor is further configured to measure the reliability of the first-type input image by using the neural network.

16. The eye tracking method of claim 13, wherein the processor is further configured to control an IR light source in response to the switching of the modality.

17. The eye tracking method of claim 13, wherein the processor is further configured to:
determine a detection box corresponding to the user eyes in a first frame of an input image by scanning entire area of the first frame;
track the user eyes in a second frame of the input image by using information on the detection box without scanning entire area of the second frame.

18. The eye tracking method of claim 13, wherein the processor is further configured to switch the modality depending on driving situations.

19. The eye tracking method of claim 13, wherein the first wavelength band comprises visible light band and the second wavelength band comprises IR light band, and
wherein both of the first-type input image and a second-type input image of the second modality are obtained by using a camera generating the first-type input image and the second-type input image without an IR cut filter.

* * * * *